US011200591B2

(12) United States Patent
Haddadnia (10) Patent No.: US 11,200,591 B2
(45) Date of Patent: Dec. 14, 2021

(54) ELECTRONIC CONTENT BASED ON NEURAL NETWORKS

(71) Applicant: PayPal, Inc., San Jose, CA (US)

(72) Inventor: Justin Haddadnia, New York, NY (US)

(73) Assignee: PayPal, Inc., San Jose, CA (US)

( * ) Notice: Subject to any disclaimer, the term of this patent is extended or adjusted under 35 U.S.C. 154(b) by 66 days.

(21) Appl. No.: 15/992,520

(22) Filed: May 30, 2018

(65) Prior Publication Data

US 2019/0370851 A1 Dec. 5, 2019

(51) Int. Cl.
| | | |
|---|---|---|
| *G06F 30/00* | (2020.01) | |
| *G06Q 30/02* | (2012.01) | |
| *G06N 3/04* | (2006.01) | |
| *G06T 7/00* | (2017.01) | |
| *G10L 25/48* | (2013.01) | |
| *G06F 40/40* | (2020.01) | |

(52) U.S. Cl.
CPC ........ *G06Q 30/0244* (2013.01); *G06F 40/40* (2020.01); *G06N 3/04* (2013.01); *G06T 7/0002* (2013.01); *G10L 25/48* (2013.01); *G06T 2207/20084* (2013.01); *G06T 2207/30168* (2013.01)

(58) Field of Classification Search
CPC .... G06Q 30/0244; G06N 3/04; G06T 7/0002; G06T 2207/20084; G06T 2207/30168; G10L 25/48; G06F 17/28
See application file for complete search history.

(56) References Cited

U.S. PATENT DOCUMENTS

| | | | | |
|---|---|---|---|---|
| 9,761,276 | B1 * | 9/2017 | Bell | G11B 27/031 |
| 9,898,743 | B2 * | 2/2018 | Bessler | G06Q 30/01 |
| 10,084,964 | B1 * | 9/2018 | Svendsen | G06K 9/00228 |
| 10,475,172 | B2 * | 11/2019 | Aaron | G06T 7/0002 |
| 10,607,165 | B2 * | 3/2020 | Punera | G06Q 10/06311 |

(Continued)

FOREIGN PATENT DOCUMENTS

| | | | | | |
|---|---|---|---|---|---|
| CN | 107808278 | A | * | 3/2018 | G06Q 10/10 |
| CN | 110188978 | A | * | 8/2019 | G06Q 10/06 |
| CN | 110443574 | A | * | 11/2019 | G06Q 10/10 |

OTHER PUBLICATIONS

Chad Crowe. Predicting User Interaction on Social Media using Machine Learning. (Nov. 2018). Retrieved online Jul. 28, 2021. https://digitalcommons.unomaha.edu/cgi/viewcontent.cgi?article=3926&context=studentwork (Year: 2018).*

(Continued)

*Primary Examiner* — James A Reagan (74) *Attorney, Agent, or Firm* — Haynes and Boone, LLP (57) ABSTRACT

Systems and methods for modifying a property of a post are provided. A post that includes image content, textual content, and amount content is posted to a platform. Engagement activity data for the post is collected. A matrix that includes scores for properties of the image content, the textual content, audio content, and the amount content is generated. The matrix, the engagement activity data, and engagement information associated with multiple previously posted posts are used to generate an estimated success level of the post. Depending on the estimated success level for the post, a post property may be modified and the post with the modified property replaces the post on the platform.

19 Claims, 5 Drawing Sheets

(56) References Cited

U.S. PATENT DOCUMENTS

| | | | |
|---|---|---|---|
| 10,846,587 B2* | 11/2020 | Liu | G06N 5/022 |
| 2007/0263550 A1* | 11/2007 | Perng | H04L 43/045 |
| | | | 370/252 |
| 2008/0040175 A1* | 2/2008 | Dellovo | G06Q 30/0242 |
| | | | 705/7.36 |
| 2012/0215903 A1* | 8/2012 | Fleischman | G06Q 50/01 |
| | | | 709/224 |
| 2015/0100356 A1* | 4/2015 | Bessler | G06Q 30/01 |
| | | | 705/7.12 |
| 2015/0134389 A1* | 5/2015 | Punera | G06Q 10/063114 |
| | | | 705/7.15 |
| 2016/0147760 A1* | 5/2016 | N | G06Q 50/01 |
| | | | 707/751 |
| 2016/0150162 A1* | 5/2016 | Vuskovic | H04N 21/84 |
| | | | 386/281 |
| 2017/0270480 A1 | 9/2017 | Woulfe et al. | |
| 2018/0084309 A1 | 3/2018 | Katz et al. | |
| 2018/0165554 A1* | 6/2018 | Zhang | G06K 9/6256 |
| 2018/0174190 A1* | 6/2018 | Ferreira | G06Q 30/0246 |
| 2018/0284741 A1* | 10/2018 | Cella | G06N 3/0445 |
| 2019/0339687 A1* | 11/2019 | Cella | G05B 23/0229 |

OTHER PUBLICATIONS

Sahar Sohangir. Machine Learning Methods To Understand Textual Data. (Dec. 2018). Retrieved online Jul. 28, 2021. http://fau.digital.flvc.org/islandora/object/fau%3A40887/datastream/OBJ/view/Machine_Learning_Methods_to_Understand_Textual_Data.pdf (Year: 2018).*

Carolyn Parkinson et al. Similar neural responses predict friendship. (Jan. 30, 2018). Retrieved online Jul. 28, 2021. https://www.nature.com/articles/s41467-017-02722-7 (Year: 2018).*

International Search Report and Written Opinion issued for International Application No. PCT/US19/34458, dated Aug. 16, 2019, 16 pages, ISA/US.

* cited by examiner

ELECTRONIC CONTENT BASED ON NEURAL NETWORKS

TECHNICAL FIELD

The disclosure generally relates to neural networks and more specifically, to using neural networks, machine learning, and pattern recognition to dynamically modify electronic content.

BACKGROUND

Conventional social media networks may include electronic content, such as posts, that are used for fundraising, advertising, selling goods or services, etc. When content is posted to a social media platform, there is not a way to determine whether the post will be successful in its intended purpose, such as causing users to donate money, respond to advertisements, purchase goods or services, etc.

Conventionally, entities that post content to social media networks manually determine the success of the post. If the post was unsuccessful, the entity may replace the unsuccessful post with another post.

Accordingly, there is a need to improve how to determine whether the posted content is successful based on the properties of the post and the engagement activity data of the post and previous posts. There is also a need to dynamically change a property of posted content in order to increase the effectiveness of the post.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An electronic content generator of a computing device may generate content, such as a post that includes image content, textual content, amount content and audio content. A post or posted content may be associated with a request for a donation, an advertisement, or a coupon in some embodiments. A computing device may transmit content to a platform, which is then posted by the platform. As users request, view, and react to the posted content on the post platform, an engagement tracker tracks and collects engagement activity data for the post. The engagement activity data may include a number of comments that users made regarding the post content, a number and amount of donations generated from the posted, a number and/or amount of products and services purchased via the posted, a number of products or services accessed by the posted, a number of views of the posted, a length of time users spend on or viewing the post content, a number of times the posted content is shared by users, etc.

In an embodiment, a pattern recognizer and engagement analyzer may estimate a success or effectiveness level of the post. A success level of the post may be configurable and represents the success of the post on the platform, which can be defined by a user or a system and based on the goal of the post. Example levels or measures of success may be an amount of donations collected via the post, the number or amount of goods and services purchased via the post, etc. In an embodiment, if the estimate indicates that the post may not be successful, i.e., does not reach a specific level of measurable desired results, the pattern recognizer may change one or more properties of the post included in image content, textual content, audio content, or amount content.

To estimate a success level of the post, a post analyzer structured as a neural network may generate a matrix. The matrix may include scores for properties associated with the post. The matrix may include a score for one or more image properties associated with image content, a score for one or more text properties associated with the text content, a score for one or more audio properties associated with the audio content, and a score for one or more amount properties associated with the amount content.

An engagement analyzer may determine an estimated success level of the post. To estimate the success level, the engagement analyzer may plot a score for each property in the matrix with the scores for the same property for posts previously posted to the platform. The engagement analyzer may then perform a proximity analysis and determine scores that are in proximity to the score of the post, e.g., within a specific range of scores of the score of the post. In an embodiment, the engagement analyzer may repeat the above process for each score in the matrix.

When the engagement analyzer determines the scores that are close (within the specific range) to the score in the matrix, the engagement analyzer may use a regression analysis and a statistical algorithm to identity posts that correspond to the scores. Next, the engagement analyzer may identify the success levels of the identified posts and use the success levels to estimate the success level of the content posted to the platform.

In an embodiment, when the estimated success level of the post is below a configurable threshold, a pattern analyzer may modify one or more properties of the post. Once modified, the pattern analyzer may transmit the modified post to a platform which may replace the post with the modified post.

The process may repeat iteratively until the engagement analyzer determines that the estimated success level of the post is at or above a configurable threshold.

Figure 1:
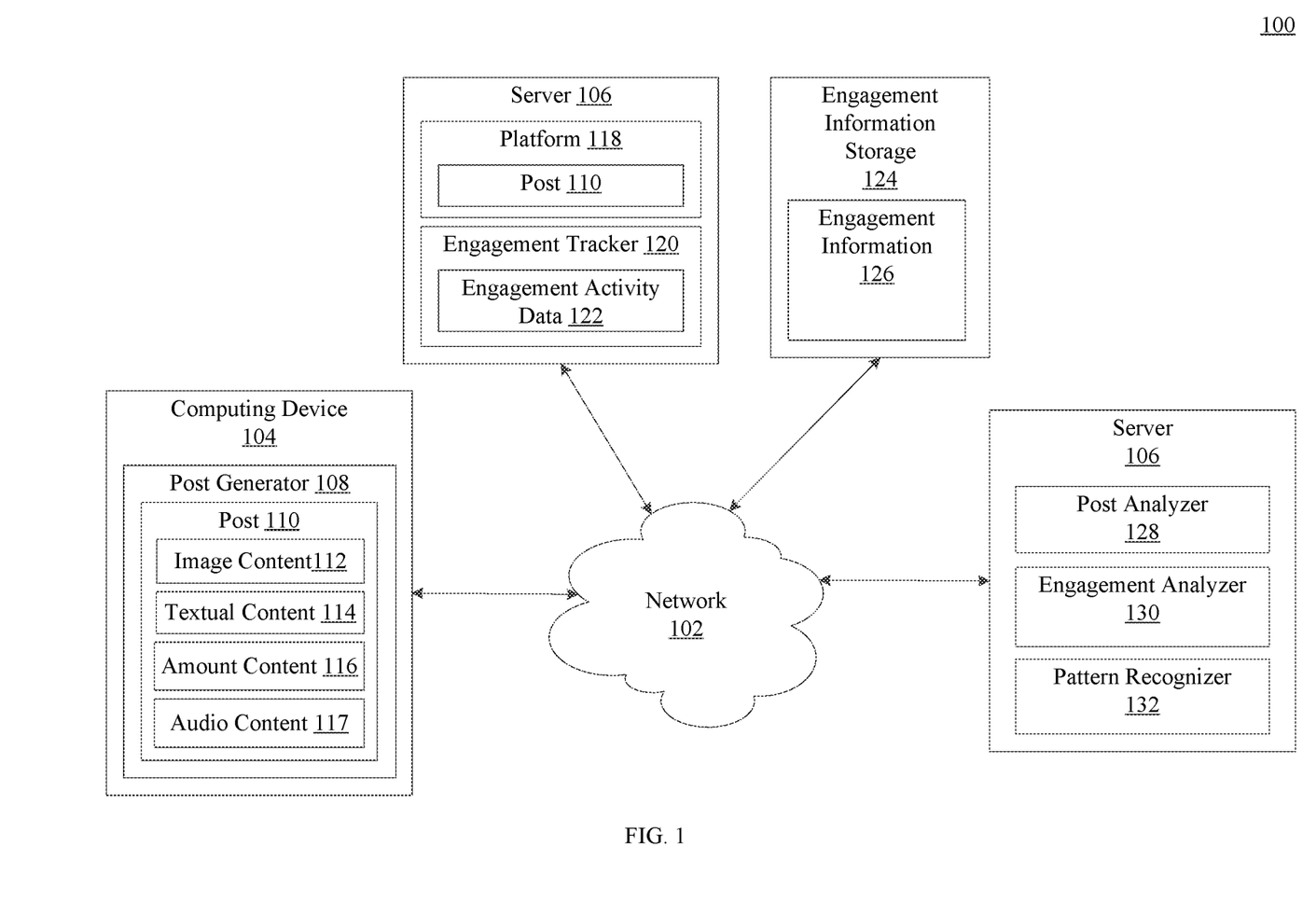
FIG. 1 is an exemplary system where embodiments can be implemented.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network.

In an embodiment, one or more computing devices 104 and servers 106 may be connected to network 102. Computing devices 104 may be portable and non-portable electronic devices under control of a user and configured to generate, transmit, receive, view, etc., content, such as web content, social media content, posts, images, videos, etc. Example computing devices 104 may include desktop computers, laptop computers, tablets, smartphones, wearable computing devices, eyeglasses that incorporate computing devices, implantable computing devices, etc.

In an embodiment, computing device 104 may include a post generator 108. Post generator 108 may be a software application that may be installed and/or execute on computing device 104. Post generator 108 may generate one or more posts, such as post 110. Post 110 may be a software structure that includes visual and textual content. Post 110 may be uploaded to and stored on server 106. Post 110 may also be downloaded to and displayed on one or more computing devices 104.

In an embodiment, post 110 may include different types of content. Example content may be an image content 112, textual content 114, amount content 116, and/or audio content 117. In an embodiment, post generator 108 may select image content 112, textual content 114, amount content 116, and/or audio content 117 for post 110 automatically or using input that post generator 108 receives from a user.

In an embodiment, image content 112 may include an image, a video, a photograph, and/or other types of visual content. Textual content 114 may include a word, a slogan, numeric or alphanumeric characters, emojis, etc. Amount content 116 may include a number, a token, a special character that designates a monetary amount, etc. Audio content 117 may include music, speech, sounds, etc.

In an embodiment, computing device 104 may upload post 110 to server 106. Server 106 may be a computing device that includes hardware and software configured for large scale processing. Server 106 may also be a computer program installed on a computing device that provides services to various applications installed on multiple computing devices 104. In an embodiment, server 106 may be maintained by a service provider, such as PAYPAL®, a telephonic service provider, a social networking service, and/or other a service providers.

In an embodiment, server 106 may include or be coupled to a platform 118. Platform 118 may include a set of services, tools, products, applications that may be accessed by users, computing devices, etc. Platform 118 may also connect various users using platform 118, provide storage medium for content associated with the users, distribute content among users, receive input such as comments, likes, etc., for content, perform monetary transactions, etc. An example platform 118 may be a social media platform, such as a Facebook™ platform, WhatsApp™ platform, Twitter™ platform, Venmo™ platform, etc.

In an embodiment, content may be textual, visual, or audio content. Example content may also include articles, books, news synopsis, images, videos, songs, etc. Content may also include posts 110 that were uploaded to server 106.

In an embodiment, platform 118 may use post 110 to advertise a product or a service, request a donation or a charitable contribution, etc. In this case, platform 118 may make post 110 available to users accessing platform 118.

In an embodiment, users may or may not access post 110. Post 110 that is accessed by multiple users may be determined to be a successful post, depending on the number of users who have accessed the post. In an embodiment, a success of post 110 may depend on image content 112, textual content 114, amount content 116, and/or audio content 117 included in post 110. Success of post 110 may be defined by post 110 raising a preconfigured amount of money, having engagement activity data above a predefined threshold over a configurable time period, etc. Because different posts 110 have different image content 112, textual content 114, amount content 116, and/or audio content 117, some posts 110 may be more successful than other posts 110 for obtaining the desired result, such as in raising money or sales of a product or a service.

To determine whether post 110 is a successful post, server 106 may include an engagement analyzer 130. Engagement analyzer 130 may be a software application designed to monitor engagement activity data 122 associated with post 110. Example engagement activity data 122 may include a number of times post 110 was accessed by the users using computing device 104, a number of times post 110 was downloaded to computing device 104, a number of times post 110 was shared between the users, a number of comments that were posted on platform 118 for post 110, a number and/or type of user reactions, such as "likes" and "dislikes", were posted on platform 118 for post 110, an amount of money that was raised due to users viewing or sharing post 110, a number of sales of items or services associated with and resulting from post 110, etc.

In an embodiment, engagement analyzer 130 may execute within server 106 or within platform 118 (not shown).

In an embodiment, system 100 may also include an engagement information storage 124. Engagement information storage 124 may be a database or another memory storage conducive to storing large amounts of data. In an embodiment, engagement information storage 124 may store engagement information 126. Engagement information 126 may include engagement activity data associated with multiple posts previously posted on platform 118. Additionally, engagement information may include scores for different properties of image content 112, textual content 114, amount content 116, and/or audio content 117 included in the previously posted posts, and which will be discussed below.

In an embodiment, server 106 may estimate a success level for post 110. Success level for post 110 may indicate how successful post 110 may be in the future for obtaining a desired result if post 110 remains on platform 118. In an embodiment, server 106 may also determine whether image content 112, textual content 114, amount content 116, and/or audio content 117 may be modified to increase the success level of post 110. To determine whether post 110 is a successful post or whether content in post 110 should be modified, server 106 may include a post analyzer 128, an engagement analyzer 130, and a pattern recognizer 132. Post analyzer 128, engagement analyzer 130, and pattern recognizer 132 may be software applications implemented on server 106 that is the same or different server 106 that includes platform 118.

As will be discussed below, post analyzer 128 may analyze different properties of image content 112, textual content 114, amount content 116, and/or audio content 117 of post 110. As will also be discussed below, engagement analyzer 130 may determine an estimated success level of post 110. As will further be discussed below, pattern recognizer 132 may modify image content 112, textual content 114, amount content 116, and/or audio content 117 of post 110 to increase the success level of post 110.

Figure 2:
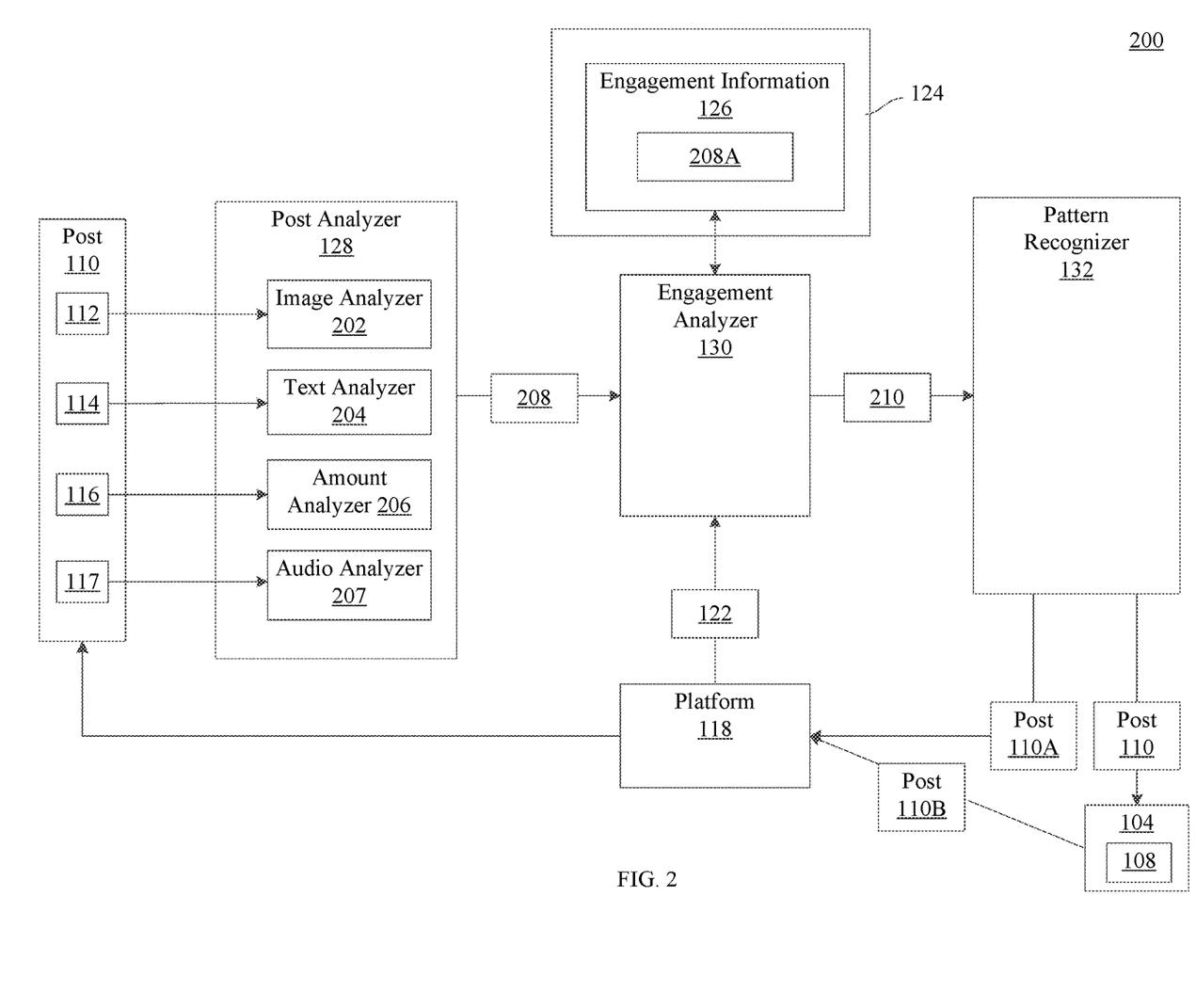
FIG. 2 is a block diagram that determines effectiveness of posted content and dynamically modifies the post, according to an embodiment.

FIG. 2 is a block diagram 200 that determines success of a post and dynamically modifies the post, according to an embodiment. Block diagram 200 includes post analyzer 128, engagement analyzer 130, and pattern recognizer 132.

In an embodiment, post analyzer 128 may receive post 110 from platform 118. This may occur any time after post generator 108 generated post 110. In an embodiment, post analyzer 128 may be a neural network that receives post 110 as input.

In an embodiment, post analyzer 128 may include an image analyzer 202, a text analyzer 204, an amount analyzer 206, and an audio analyzer 207. Image analyzer 202, text analyzer 204, amount analyzer 206, and audio analyzer 207 may be one or more applications that simulate a network of nodes. In an embodiment, image analyzer 202 may process image content 112 of post 110, text analyzer 204 may process textual content 114 of post 110, amount analyzer 206 may process amount content 116 of post 110, and audio analyzer 207 may process audio content 117 of post 110. In a further embodiment, image analyzer 202, text analyzer 204, amount analyzer 206, and audio analyzer 207 may each be a neural network or together form a neural network.

In an embodiment, image analyzer 202 may analyze image properties of image content 112 and assign a score to each property. The image analysis portion may be performed using standard image processing libraries, which are known in the art.

In an embodiment, image analyzer 202 may analyze object properties in image content 112. Object properties may be objects such as a dog, a car, a tree, a face, etc., in image content 112 and may include a number of unique objects, such as a car, a dog, a tree, a box, etc. Image analyzer 202 may generate a score based on the unique objects included in image content 112.

In another embodiment, image analyzer 202 may analyze a shape property of image content 112. Shape property may identify one or more shape types in image content 112. Example shape types may be curved lines, straight lines, prevalence of straight lines, prevalence of curved lines, etc. Image analyzer 202 may generate a score based on shapes included in image content 112.

In an embodiment, image analyzer 202 may also analyze a color property of image content 112. A color property may identify colors that are included in image content 112, prevalence of different colors included in image content 112. Image analyzer 202 may generate a score based on colors included in image content 112.

In an embodiment, image analyzer 202 may analyze a contrast property of image content 112. A contrast property may specify contrast in image content 112. Image analyzer 202 may generate a score based on contrast in image content 112.

In an embodiment, image analyzer 202 may analyze a balance property of image content 112. A balance property measures the balance of image content 112. For example, image analyzer 202 may measure distribution of objects within image content 112. Image analyzer 202 may generate a score based on a distribution of objects in image content 112.

In an embodiment, image analyzer 202 may analyze a brightness property. A brightness property may measure the brightness of image content 112 or objects within image content 112. Image analyzer 202 may generate a score based on the brightness of image content 112.

In an embodiment, text analyzer 204 analyzes textual content 114 in post 110. For example, text analyzer 204 may analyze a word property. A word property may include words that occur in textual content 114. Text analyzer 204 may use the word property to identify unique words in textual content 114. Unique words may be words, or word types, such as a noun, etc., that repeat once in textual content 114. Text analyzer 204 may generate a score based on existence and a number of unique words in textual content 114.

In an embodiment, text analyzer 204 may also analyze a word count property. The word count property identifies a number of times specific words occur in textual content 114. Text analyzer 204 may generate a score based on the repeated words in textual content 114.

In another example, text analyzer 204 may also analyze a length property. A length property identifies length of textual content 114. Text analyzer 204 may generate a score based on the length of textual content 114.

In yet another embodiment, text analyzer 204 may analyze a special character property. For example, text analyzer 204 may identify whether special characters, emojis, etc., exist in textual content 114. Text analyzer 204 may generate a score based on existence and/or number of special characters in textual content 114.

In an embodiment, amount analyzer 206 may analyze the amount property in amount content 116 of post 110. Additionally, amount analyzer 206 may also determine if amount content 116 includes unique words or phrases.

In one embodiment, audio analyzer 207 may analyze audio properties of audio content 117 of post 110. Audio properties may correspond to loudness, inflections, voice quality (e.g., male, female, deep, child, soft, shrill), accents, speed or cadence, etc., of audio content 117. Audio analyzer 207 may generate one or more scores based on audio properties of audio content 117. In another embodiment, audio analyzer 207 may use speech recognition and language processing techniques, such as, word2vec in order to translate audio content 117 into textual content 114 and/or recognize image content 112. Once translated, text analyzer 204 may use the obtained textual content 114 to determine textual properties and image analyzer 202 may use the obtained image content 112 to determine image properties.

In an embodiment, post analyzer 128 may generate a matrix 208. Matrix 208 may include one or more scores for properties of post 110. For example, matrix 208 may include scores for one or more image properties, one or more text properties, one or more amount properties, and/or one or more audio properties. In an embodiment, the dimensions of matrix 208 may correspond to a number of properties textual, visual, audio, and amount properties used to generate matrix 208. For example, matrix 208 that includes six image properties, three textual properties, and one amount property may be a 6×3×1 matrix.

In an embodiment where matrix 208 exists, post analyzer 128 may populate existing matrix 208 for post 208. Matrix 208 may exist when properties for post 208 may have previously been determined by post analyzer 128.

In an embodiment, matrix 208 may be an output of post analyzer 128.

In an embodiment, matrix 208 may be an input to engagement analyzer 130. Engagement analyzer 130 may estimate a success level of post 110. To estimate the success level of post 110, engagement analyzer 130 may use engagement activity data 122 of post 110, engagement information 126 of posts previously posted to platform 118, and matrix 208. As discussed above, engagement information 126 may include engagement activity data of posts previously posted to platform 118 and the success level of the posts, such as whether the posts met thresholds or metrics for one or more success levels. Additionally, engagement information may include matrices, such as matrix 208A, that post analyzer 128 generated for previously posted posts.

To estimate a success level of post 110, engagement analyzer 130 may generate a plot for each property in matrix 208. The plot may include a score for a property in matrix 208 and scores for the same property in the previously posted posts. For example, engagement analyzer 130 may plot the score for an object property of image content 112 in matrix 208 and scores for the objects property for image content in the previously posted posts. In another example, engagement analyzer 130 may generate a plot that includes a score for a color property in matrix 208 and scores for the color property for image content in previously posted posts. In yet another example, engagement analyzer 130 may generate a plot of a score for the word property in textual content 114 in matrix 208 and scores for the word property of textual content of previously posted posts. In yet another example, engagement analyzer 130 may generate a plot of a score for an amount property in matrix 208 and scores for the amount property in previously posted posts, etc. In a further example, engagement analyzer 130 may generate a plot a score for an audio property in matrix 208 and scores for the audio property in previously posted posts, etc.

Next, in an embodiment, engagement analyzer 130 may perform a proximity analysis on the scores in each plot. The proximity analysis may determine one or more scores associated with the previously posted posts that are in proximity (within a set range) to a score for post 110. For example, engagement tracker 120 may perform a proximity analysis on a plot for an object property, and identify scores for the object property in the previously posted posts that are in proximity to the object property score from matrix 208 for post 110. In an embodiment, engagement analyzer 130 may repeat the above proximity analysis for each plot that corresponds to a score for a property in matrix 208. In an embodiment, a value that constitutes for the scores to be in proximity of each other may be configured for each property.

Once engagement analyzer 130 identifies the scores that are in proximity to scores of matrix 208 for post 110, engagement analyzer 130 may use regression analysis and statistical algorithms (such as a Bayes algorithm) to determine which previously posted posts are similar (within a specific distance or range for one or more scores) to post 110. In the regression analysis, engagement analyzer 130 may select a property and may then select a score from the plot that is in proximity or within a specific range to the score from matrix 208 and identify one or more previously posted posts associated with the score. Engagement analyzer 130 may then identify a success level of the identified one or more posts from engagement information 126. In an embodiment, the identified success level is the estimated success level for post 110 for that property.

In an embodiment, engagement analyzer 130 may determine an estimated success level for post 110 for each property for which engagement analyzer 130 generated a plot.

In an embodiment, engagement analyzer 130 may determine an estimated success level 210 of post 110 by averaging the estimated success levels that engagement analyzer 130 generated for each property of post 110. In a further embodiment, engagement analyzer 130 may assign different weights to the estimated success levels of different properties. In this way, some properties may have more weight in determining estimated success level 210 than other properties. For example, one property, such as an object property or an amount property may have more weight than the color property or the shape property to determine the estimated success level 210 of post 110.

In an embodiment, estimated success level 210 of post 110 may be an approximation regarding the amount of money that may be raised or products or services purchased when post 110 is displayed on platform 118.

In an embodiment, engagement analyzer 130 may also store engagement activity data 122 for post 110 in engagement information storage 124 in order to establish historical trends and correlations between the attributes of post 110 and engagement activity data 122 during lifetime of post 110 on platform 118. The correlations may be used to evaluate estimated success levels of future posts that are uploaded to platform 118.

In another embodiment, engagement analyzer 130 may use engagement activity data 122 to determine success of post 110 as compared to success levels of posts previously uploaded to platform 118. For example, engagement analyzer 130 may determine if engagement activity data 122 indicates that post 110 is more successful than the engagement indicated by estimated success level 210 of post 110. If engagement analyzer 130 determines that engagement activity data 122 indicates that post 110 is more successful in engaging users than the engagement indicated by estimated success level 210, engagement analyzer 130 may replace data in estimated success level 210 with data from engagement post 130 before transmitting estimated success level 210 to pattern recognizer 132.

In an embodiment, pattern recognizer 132 may receive estimated success level 210 for post 110. Depending on whether estimated success level 210 is below a configurable threshold, pattern recognizer 132 may modify one or more properties of post 110 and transform post 110 into post 110A. For example, pattern recognizer 132 may modify image content 112 of post 110. In another example, pattern recognizer 132 may modify textual content 114 or add a special character to textual content 114. In another example, pattern recognizer 132 may raise or lower an amount in amount content 116. In yet another embodiment, pattern recognizer 132 may change a voice type, add sounds, etc., to audio content 117. In yet another embodiment, instead of modifying one or properties, pattern recognizer 132 may replace image content 112, textual content 114, amount content 116 and/or audio content 117 from post 110 and transform post 110A into post 110.

To identify which property to modify, pattern recognizer 132 may identify one or more properties in the previously posted posts that have scores that are proximate to post 110 and that have been more engaged by users than post 110, such as measured by metrics described above.

In an embodiment, pattern recognizer 132 may transmit post 110A back to platform 118. When platform 118 receives post 110A, platform 118 may dynamically change post 110 into post 110A such that post 110A and not post 110 is accessible to the users. Once on platform 118, post 110A may receive comments, contributions, likes, etc., over a configurable time period. After the configurable time period ends, platform 118 may transmit post 110A to post analyzer 128 and engagement analyzer 130 to determine a success level of post 110A (not shown). In an embodiment, the process above may be repeated iteratively until the estimated success level of the post on platform 118 is at or above a configurable threshold.

In an embodiment, pattern recognizer 132 may determine that estimated success level 210 of post 110 is below a minimal success level threshold. In this case, post analyzer 132 may pass post 110 to post generator 108 of computing device 104 with instructions for post generator 108 to generate another post, such as post 110B or to receive input from a user to change image content 112, textual content 114 amount content 116, and/or audio content 117 of post 110B.

Figure 3:
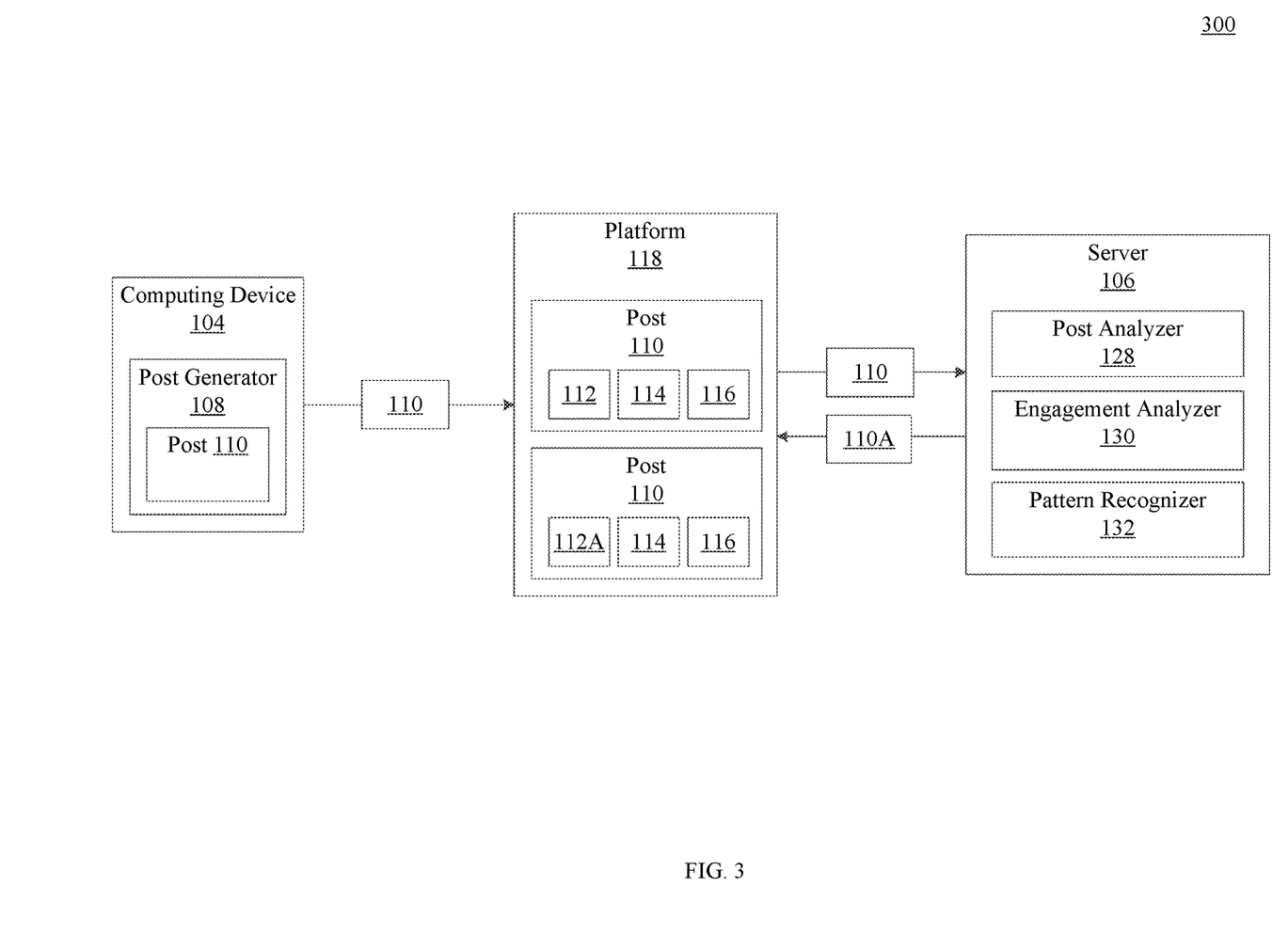
FIG. 3 is a block diagram of a platform including posted content and modified posted content, according to an embodiment.

FIG. 3 is a block diagram 300 of a platform including a post and a modified post according to an embodiment. As illustrated in FIG. 3, platform 118 may receive post 110 that was generated by post generator 108 of computing device 104. Post 110 may include image content 112, textual content 114, amount content 116, and/or audio content 117. In an embodiment, post 110 may be transmitted to server 106 where post analyzer 128 and engagement analyzer 130 may determine estimated success level 210 of post 110. As further illustrated in FIG. 3, pattern recognizer 132 modifies post 110 into 110A by changing one of properties of image content 112. The modified image content 112 is shown as image content 112A. Once pattern recognizer 132 modifies post 110 into post 110A, server 106 may transmit post 110A to platform 118.

In an embodiment, when platform 118 receives post 110A, platform 118 may replace post 110 with post 110A (not shown). In this way, users accessing platform 118 via the computing devices may view post 110A instead of post 110.

Figure 4:
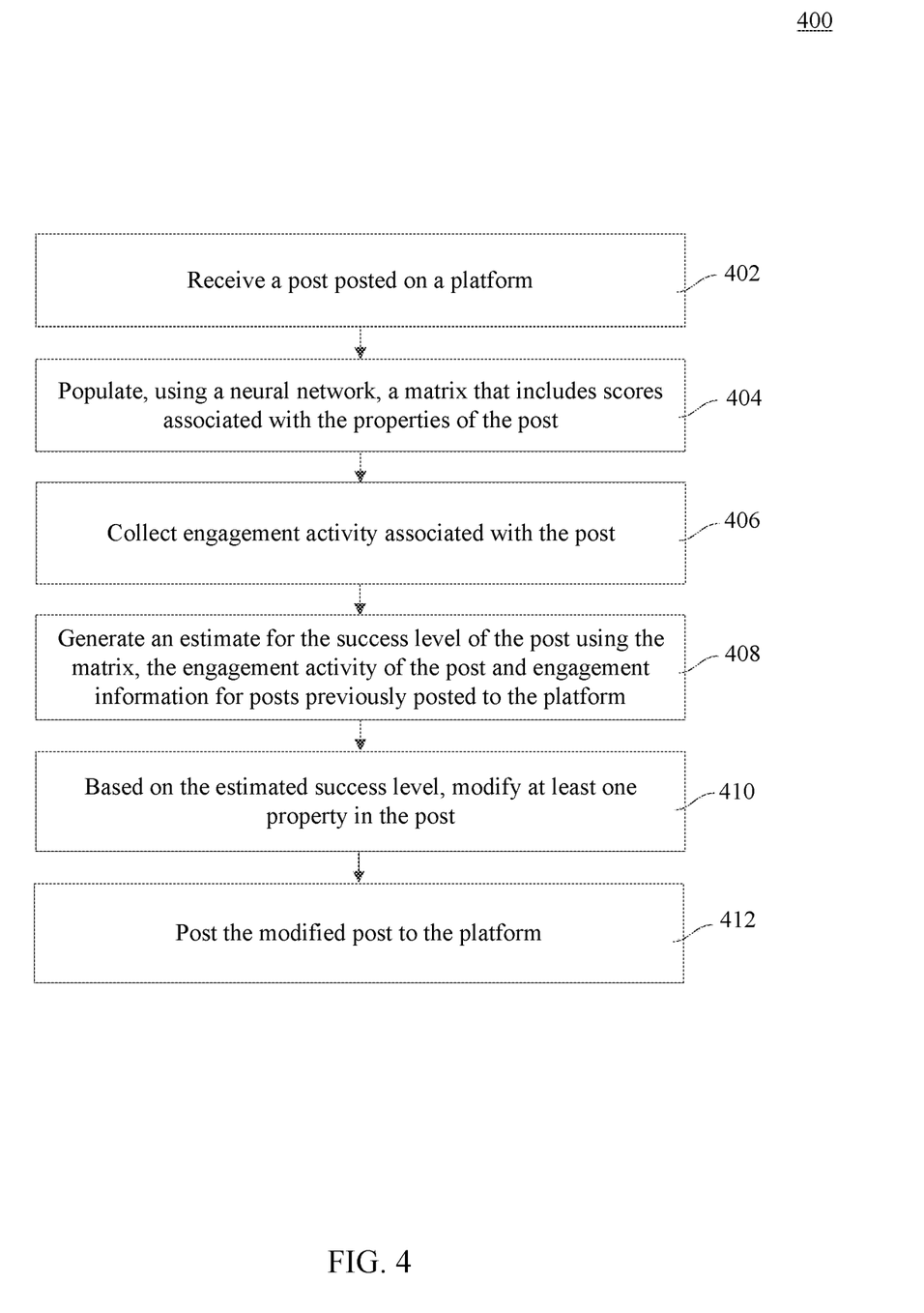
FIG. 4 is a flowchart of a method for evaluating and dynamically modifying posted content, according to an embodiment.

FIG. 4 is a flowchart of a method 400 for estimating success of a post and modifying the post, according to an embodiment. Method 400 may be performed using hardware and/or software components described in FIGS. 1-3. Note that one or more of the operations may be deleted, combined, or performed in a different order as appropriate.

At operation 402, content is posted. For example, post 110 that includes image content 112, textual content 114, amount content 116, and/or audio content 117 may be posted to platform 118.

At operation 404, a matrix is populated. For example, post analyzer 128 may populate matrix 208 that includes scores for one or more image properties, text properties, amount properties, and/or audio properties of post 110. In an embodiment, operation 404 may occur any time after engagement activity data for the post is collected. For example, engagement post generator 108 generates post 110.

At operation 406, tracker 120 may track and store engagement activity data 122 for post 110 over a configurable time period.

At operation 408, an estimate success level is determined. For example, engagement analyzer 130 may use matrix 208, engagement activity data 122, and engagement information 126 from previously posted posts to obtain estimated success level 210 for post 110. In an embodiment, operation 408 may occur after the configurable time period in operation 406 completes.

At operation 410, one or more properties of a post are modified. For example, pattern recognizer 132 may receive estimated success level 210 of post 110 and generate post 110A by modifying one or more properties of post 110. For example, pattern recognizer 132 may modify an object property of image content 112 in post 110 and/or amount property in amount content 116 of post 110 to a property that may increase the success level of post 110.

At operation 412, a modified post is posted to platform 118. For example, pattern recognizer 132 may post 110A to platform 118.

In an embodiment, after post 110A receives engagement activity data 122, post 110A may be reevaluated to determine whether one or more properties in post 110A may be modified to increase the success level of post 110A. Further, the process described in method 400 may repeat iteratively until the estimated success level no longer changes or is at or greater than a preconfigured threshold.

Accordingly, using a post analyzer 128 structured as a neural network, engagement analyzer 130 and pattern recognizer, electronic content can be dynamically modified to improve the effectiveness of such content for desired results, such as sales of a product or service, money raised, viewing of content associated with the content (such as for social awareness), and the like. The content may be continually or iteratively modified until a desired measurable level of success is obtained.

Going back to FIG. 1, in an embodiment, system 100 may be included within a payment system, mobile payment system such as Venmo™, compensation systems, etc. In one example, a user using a payment system may install, download, etc., a payment application that communicates with platform 118 onto computing device 104, and use the payment application to transfer money, receive money, etc. In some embodiments, a user may use the payment application to raise money for a campaign, charity, shelter etc. Example shelter may be a pet shelter. In order to raise money, a user may access post generator 108 that generates post 110 that may cause users to donate money.

Post generator 108 may receive content, such as image content 112, textual content 114, amount content 116, and/or audio content 117 from a user. Post generator 108 may then use the content to generate post 110. For example, post 110 may include an image of a dog, a message such as "Save Pets" and an amount for $100. Once post generator 108 generates post 110, post generator 108 or mobile application may transmit post 110 to platform 118 where post 110 may be accessed or downloaded to payment applications that execute on computing devices 104 of multiple users.

In an embodiment, users may use payment applications to access post 110. As users access post 110, users may cause the payment application to generate comments, likes, payments, etc., in response to accessing post 110. As users access post 110, engagement tracker 120 may track and store the comments, likes, payments, etc., associated with post 110 as engagement activity data 122.

In an embodiment, when post generator 108 generates post 110, post 110 may be transmitted to post analyzer 110. Post generator 110 may generate matrix 208 associated with image content 112, textual content 114, amount content 116, and audio content 117 for post 110, by analyzing the image of the dog, the "Save Pets" message, and the $100 amount.

In an embodiment, after a configurable time interval, such as five days, a week, etc., engagement analyzer 130 may receive matrix 208 from post analyzer 128, engagement activity data 122, and engagement information 126 for posts that were previously posted on platform 118. Using the analysis described above, engagement analyzer 130 may determine estimated success level 210 of post 110, and transmit the estimated success level 210 to pattern recognizer 132.

Based on estimated success level 210, pattern recognizer 132 may modify the color property of "Save Pets" textual content 114 to bright red to make post 110 more successful by attracting attention in one embodiment. In another embodiment, pattern recognizer 132 may modify the "$100" amount property 116 to "$25" to make post 110 more successful by lowering the contribution amount. In yet another embodiment, pattern recognizer 110 may modify the image content from an image of a dog to an image that includes an image of group of dogs and cats to make post 110 more successful. In yet another embodiment, estimated success level 210 may indicate that post 110 may have received a lot of negative comments. In this case, pattern recognizer 132 may determine, based on estimated success level 210 to send post 110 to computing device 104 in order for post generator 108 to generate post 110B with different image content 112, textual content 114, amount content 116, and/or audio content 117.

Figure 5:
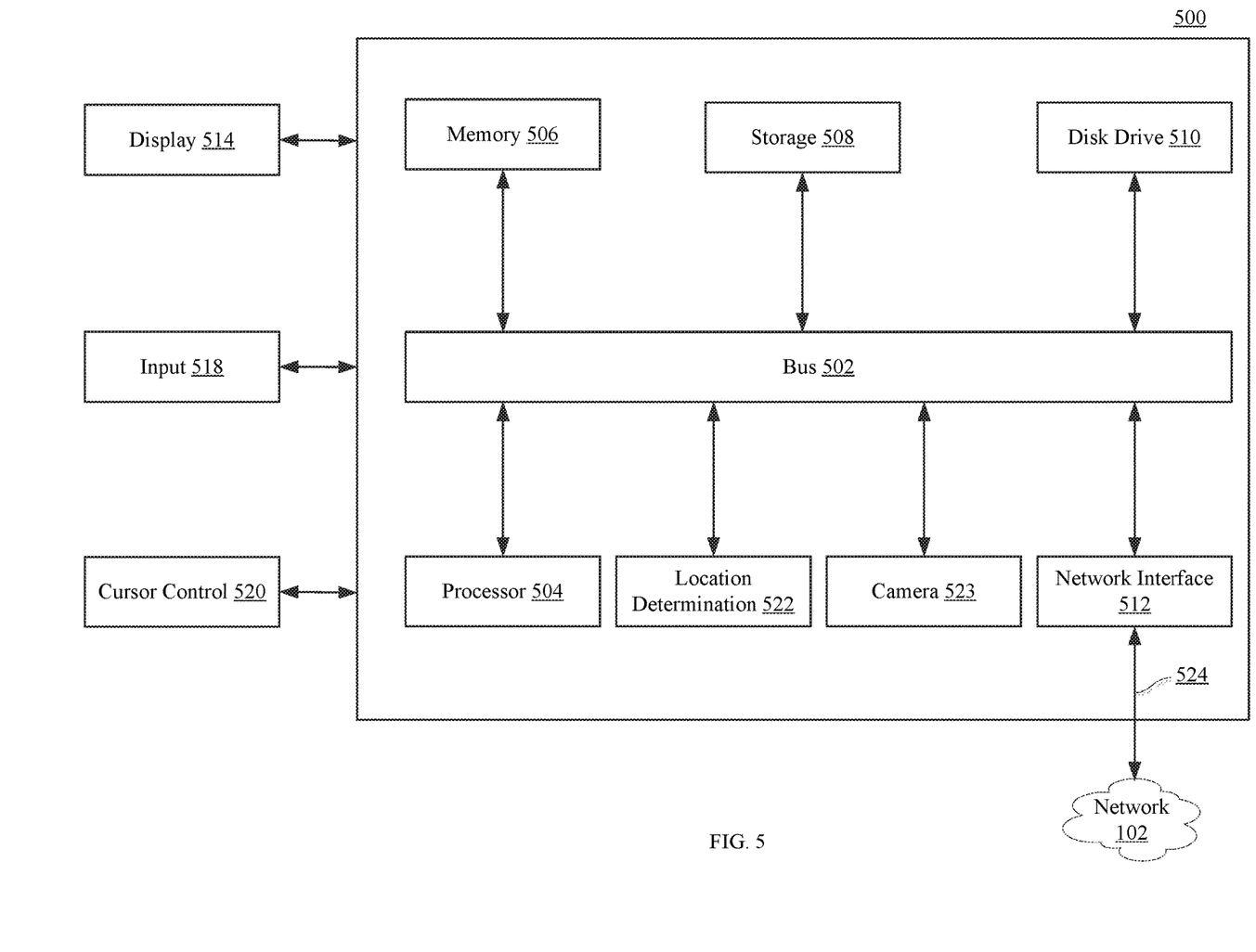
FIG. 5 is a block diagram of a computer system suitable for implementing one or more components or operations in FIGS. 1-4 according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processing component 504 executing one or more sequences of instructions contained in the system memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processing component 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
receiving electronic content posted on a platform in a post;
generating, using a post analyzer neural network that includes an image neural network and a textual neural network, a matrix that includes scores for a plurality of properties associated with the post, wherein the post includes at least one image property and at least one text property and one score from the scores is generated by passing the at least one image property through the image neural network and second score from the scores is generated by passing the at least one text property through the textual neural network; and
generating, using an engagement analyzer, an estimated success level for the post until the estimated success level is greater than a preconfigured level threshold, wherein the engagement analyzer performs operations comprising:
accessing a plurality of previous scores for a plurality of posts previously posted, wherein the previous scores have been generated using the post analyzer neural network;
plotting a score in the matrix that corresponds to a property in the plurality of properties of the post and the plurality of previous scores for the same property in the plurality of posts previously posted, wherein the score in the matrix is generated using the post analyzer neural network;
performing a proximity analysis between the score in the matrix associated with the post and the previous scores for the plurality of posts previously posted
selecting one or more previous scores from the plurality of previous scores based on the proximity analysis, wherein a score difference between the score in the matrix associated with the post and the one or more previous scores for the plurality of posts previously posted is below a configurable threshold;
selecting one or more posts from the plurality of posts previously posted based on the one or more previous scores; and
generating the estimated success level based on the one or more posts; and
once the estimated success level is greater than the preconfigured level threshold, modifying using a pattern recognizer, at least one property in the plurality of properties of the post posted on the platform, wherein the post with the modified at least one property has an increased success level than the estimated success level of the post posted on the platform.

2. The system of claim 1, wherein the operations further comprise:
posting the modified post to the platform, wherein the modified post replaces the post.

3. The system of claim 1, wherein the at least one property in the plurality of properties is associated with an image component of the post; and
wherein the operations further comprise determining, using an image processing neural network in the post analyzer neural network, an image score in the matrix that corresponds to the at least one property.

4. The system of claim 1, wherein the at least one property in the plurality of properties is associated with a text content of the post; and
wherein the operations further comprise determining, using a text processing neural network in the post analyzer neural network, a text score in the matrix that corresponds to the at least one property.

5. The system of claim 1, wherein the at least one property in the plurality of properties is associated with an audio content of the post; and
wherein the operations further comprise determining, using an audio processing neural network in the post analyzer neural network, an audio score in the matrix that corresponds to the at least one property.

6. The system of claim 1, wherein the operations further comprise:
identifying a first score in the matrix, wherein the first score is associated with a first property in the plurality of properties of the post;
comparing the first score in the matrix to a plurality of previous scores associated with the first property in the plurality of posts previously posted;
selecting a first previous post from the plurality of posts previously posted with a score difference below a preconfigured threshold; and
identifying a success level for the first previous post based on engagement information associated with the plurality of posts previously posted; and
wherein the estimated success level for the post is generated based further on the success level of the first previous post.

7. The system of claim 6, wherein the operations further comprise:
identifying a second score in the matrix, wherein the second score is associated with a second property in the plurality of properties of the post;
comparing the second score to a plurality of previous scores associated with the second property of the plurality of posts previously posted;
selecting a second post from the plurality of posts previously posted with a score difference below a second preconfigured threshold; and
identifying a second success level for the second post based on engagement information associated with the plurality of posts previously posted; and
wherein the estimated success level for the post is generated based further on the second success level.

8. The system of claim 7, wherein the operations further comprise:
assigning a first weight to the success level and a second weight to the second success level; and
wherein the generating of the estimated success level for the post is based further on the first weight of the success level and the second weight to the second success level.

9. The system of claim 1, wherein the operations further comprise:
generating, using the post analyzer neural network, a second matrix that includes second scores for a plurality of properties of the modified post;
generating, a second estimated success level for the modified post using the second matrix and engagement information associated with the plurality of posts previously posted; and based on the second estimated success level, modifying, using the pattern recognizer, the at least one property in the plurality of properties of the modified post.

10. A method, comprising:

receiving a post posted on a platform;

generating, using a post analyzer neural network that includes an image neural network and a textual neural network, a matrix that includes scores for a plurality of properties associated with the post, wherein the post includes at least one image property and at least one text property and a first score from the scores is generated by passing the at least one image property through the image neural network and a second score from the scores is generated by passing the at least one text property through the textual neural network;

receiving engagement activity data associated with the post and engagement information associated with a plurality of posts previously posted on the platform, wherein the engagement information includes previous scores for properties in the plurality of posts previously posted, and wherein the previous scores have been generated using the post analyzer neural network;

generating, using an engagement analyzer, an estimated success level for the post until the estimated success level is greater than a preconfigured level threshold by:
 plotting a score in the matrix that corresponds to a property in the plurality of properties associated with the post and the previous scores for the property from the properties in the plurality of posts previously posted, wherein the score in the matrix is generated using the post analyzer neural network;
 performing a proximity analysis between the score in the matrix associated with the post and the previous scores for the property in the plurality of posts previously posted;
 selecting one or more scores from the previous scores based on the proximity analysis, wherein a score difference between the score in the matrix associated with the post and the previous scores for the property in the plurality of posts previously posted is below a configurable threshold;
 selecting one or more posts from the plurality of posts previously posted based on the one or more scores; and
 generating the estimated success level based further on the one or more posts; and once the estimated success level is greater than the preconfigured level threshold, modifying using a pattern recognizer, at least one property in the plurality of properties of the post, wherein the post with the modified at least one property has an increased success level than the estimated success level of the post posted on the platform.

11. The method of claim 10, further comprising:
causing the post to be replaced with the modified post on the platform; and
determining an estimated success level for the modified post.

12. The method of claim 10, wherein the matrix includes a score associated with an amount property of the post, wherein the score is generated by passing the amount property through an amount neural network in the post analyzer neural network.

13. The method of claim 10, wherein the engagement information includes the engagement activity data for the plurality of posts previously posted and previous scores for the plurality of properties in the plurality of posts.

14. The method of claim 13, further comprising:
identifying first posts in the plurality of posts previously posted where a difference between the first score and the previous scores for the at least one image property of the posts in the plurality of posts previously posted is below a first configurable threshold;
identifying second posts in the plurality of posts previously posted where a difference between the second score and the previous scores for the at least one text property of the posts in the plurality of posts previously posted is below a second configurable threshold; and
determining, using the engagement information, success levels of the first posts and the second posts;
wherein the estimated success level for the post is generated based further on the success levels of the first posts and the second posts.

15. The method of claim 14, further comprising:
assigning a first weight to a first success level in the success levels and a second weight to a second success level in the second success levels; and
wherein generating the estimated success level for the post is based on the first weight of the first success level and the second weight to the second success level.

16. The method of claim 10, further comprising:
generating a second matrix that includes second scores for a plurality of properties of the modified post;
receiving, using the engagement analyzer, a second engagement activity data associated with the modified post;
generating, a second estimated success level for the modified post using the second matrix, the second engagement activity data, and the engagement information associated with the plurality of posts; and
based on the second estimated success level, modifying, using the pattern recognizer, at least one property in the plurality of properties of the modified post.

17. A non-transitory machine-readable medium having stored thereon machine-readable instructions executable to cause a machine to perform operations comprising:

receiving a post posted to an electronic platform;

generating, using a post analyzer neural network that includes an image neural network and a textual neural network, a matrix that includes scores associated with a plurality of properties associated with the post, wherein the post includes at least one image property and at least one text property and a first score from the scores is generated by passing the at least one image property through the image neural network and a second score from the scores is generated by passing the at least one text property through the textual neural network;

receiving engagement activity data associated with the post and engagement information associated with a plurality of posts previously posted on the electronic platform, wherein the engagement information includes previous scores for the plurality of posts previously posted and wherein the previous scores were generated using the post analyzer neural network;

generating, using an engagement analyzer, an estimated success level for the post, wherein the engagement analyzer performs operations comprising:
 plotting a score in the matrix that corresponds to a property in the plurality of properties for the post and the previous scores for the property in the plurality of posts previously posted, wherein the score in the matrix is generated using the post analyzer neural network;

performing a proximity analysis between the score in the matrix associated with the post and the previous scores for the plurality of posts previously posted;

selecting one or more scores from the previous scores based on the proximity analysis, wherein a score difference between the score in the matrix associated with the post and the previous scores for the plurality of posts previously posted is below a configurable threshold;

selecting one or more posts from the plurality of posts previously posted based on the one or more scores; and generating the estimated success level based further on the one or more posts; and based on the estimated success level modifying, using a pattern recognizer, at least one property in the plurality of properties of the post, wherein the post with the modified at least one property has an increased success level than the estimated success level of the post posted on the electronic platform.

18. The non-transitory machine-readable medium of claim 17, wherein the at least one property is an amount property, the at least one image property, the at least one text property, or an audio property.

19. The non-transitory machine-readable medium of claim 17, wherein the operations further comprise:

determining a second estimated success level for the modified post; and modifying, using the pattern recognizer, an image property of the plurality of properties of the modified post.

* * * * *